United States Patent [19]

Collins et al.

[11] Patent Number: 5,080,152

[45] Date of Patent: Jan. 14, 1992

[54] VERSATILE PRECISION WOODWORKING APPARATUS

[75] Inventors: Michael Collins; Jerry M. Multop, both of Woodlands, Tex.

[73] Assignee: Progressive Technology, Inc., Houston, Tex.

[21] Appl. No.: 628,901

[22] Filed: Dec. 18, 1990

[51] Int. Cl.$^5$ .............................................. B27C 5/10
[52] U.S. Cl. ...................... 144/134; 83/574; 83/745; 144/136 C; 409/182
[58] Field of Search .......... 144/134 R, 134 D, 136 R, 144/136 C, 137, 323; 409/182; 83/574, 743, 745; 33/26, 27.04, 27.07

[56] References Cited

U.S. PATENT DOCUMENTS

| | | | |
|---|---|---|---|
| 3,151,642 | 10/1964 | Olson | 83/574 |
| 4,155,383 | 5/1979 | Welliver | 144/134 D |
| 4,281,694 | 8/1981 | Gorman | 144/134 D |
| 4,630,656 | 12/1986 | Collins | 144/134 D |
| 4,735,531 | 4/1988 | Boerckel et al. | 144/134 D |
| 4,957,024 | 9/1990 | Albrecht | 83/574 |
| 4,995,288 | 2/1991 | Dellapolla | 83/574 |

Primary Examiner—W. Donald Bray
Attorney, Agent, or Firm—Low and Low

[57] ABSTRACT

A versatile woodworking device for hobbyist or professional use which is rugged, reliable, precise, and portable, wherein woodworking accessory equipment may be selectively and quickly mounted thereto for use therewith, as hand-held circular saws, routers, shapers, radial arm saws, and the like.

A pair of spaced rails are provided having a slidable carriage therebetween, wherein a desired woodworking power tool is mounted upon a mounting plate carried by and detachable from the slidable carriage. The tool mounting plate is rotatable with respect to the carriage thereby to position the tool as desired with respect to the workpiece and the carriage, and fixed in position if desired. The carriage itself may also be releasably fixed with respect to the slide rails. Scale indicia means permit precise positioning and repositioning of the carriage as desired with accuracy.

27 Claims, 5 Drawing Sheets

FIG. 3
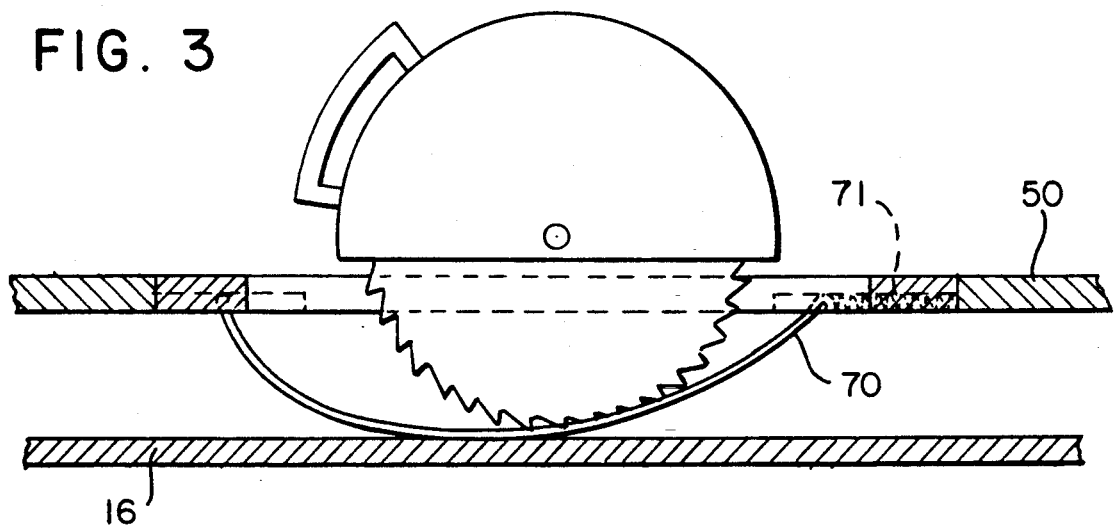
FIG. 4
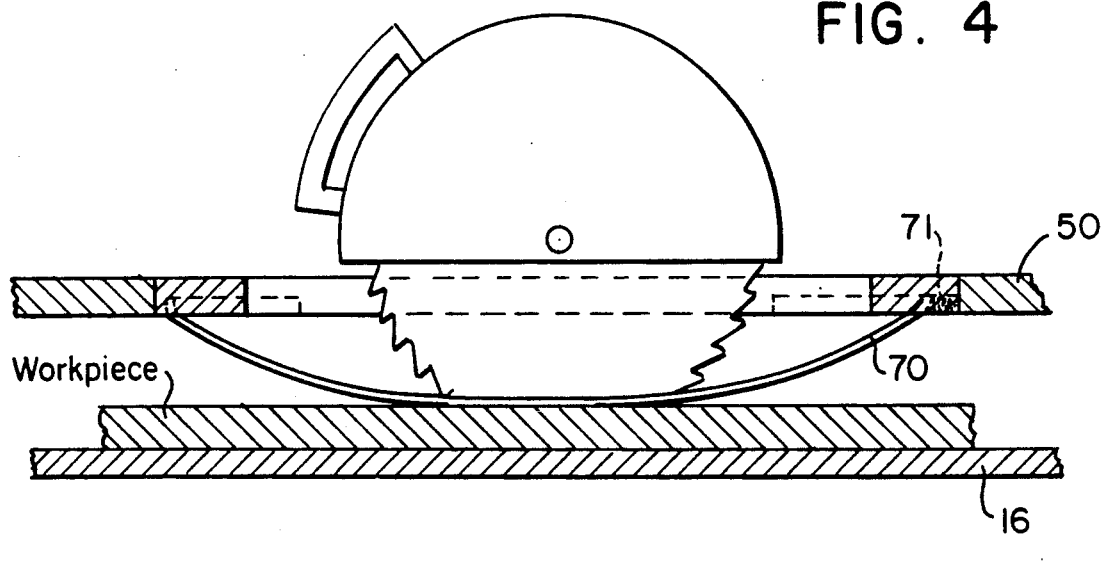
Workpiece
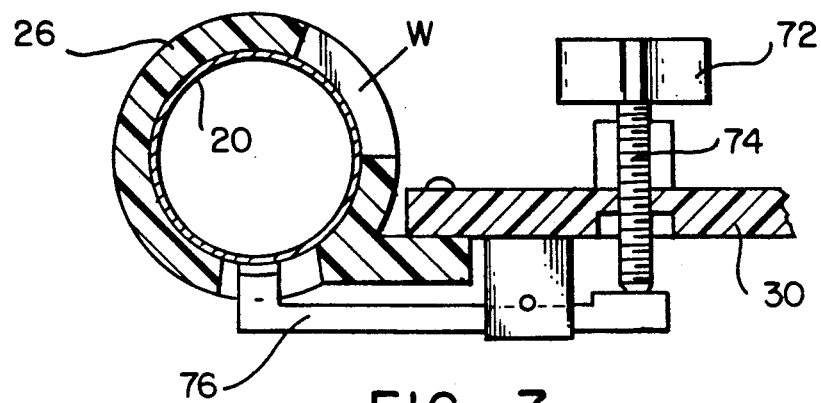
FIG. 7

FIG. 8
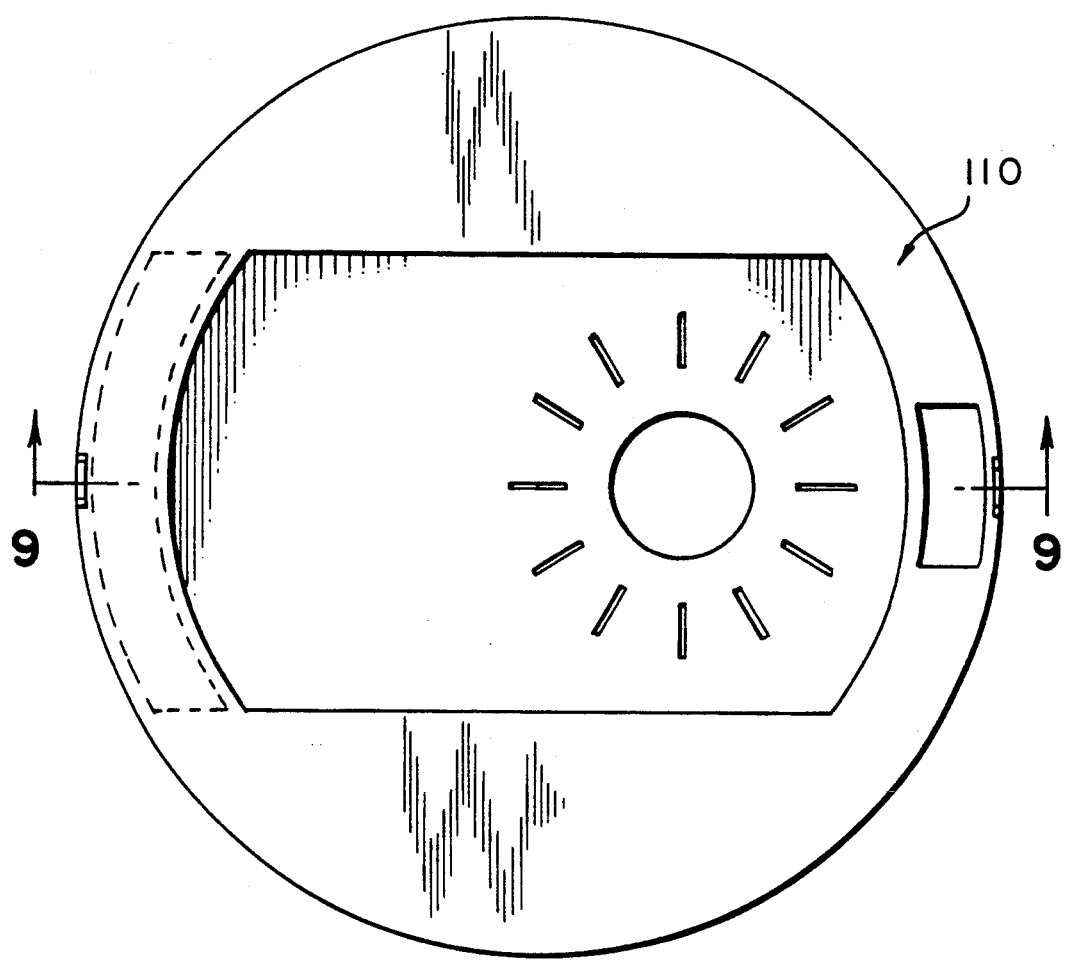
FIG. 9

VERSATILE PRECISION WOODWORKING APPARATUS

BACKGROUND OF THE INVENTION

Lack of portability and significant expense render impractical the versatile use of otherwise excellent woodworking equipment such as circular table saws, table routers, and the like, especially in small shops, or by a hobbyist, or at a job site. Conversely, while hand-held circular saws, routers, saber saws, radial arm saws, shapers, and other like power woodworking tools are readily available to the professional as well as the hobbyist, whether in a small shop or at a work site, the necessity to control the same almost solely by the hand and arm and without rigid and accurate guide means renders it substantially more difficult to work not only efficiently and rapidly, but also with precision and accuracy.

There have been developed numerous and diverse woodworking adjuncts in efforts to relieve this problem. Nonetheless, quite generally the same are either oversimplified so as not to provide the guidance and reliability necessary, are usable only with a single tool, or are so complex of fabrication, setup, and use as to not be practical in achieving sustained, swift, and reliable woodwork output by the user, whether amateur or professional.

BRIEF SUMMARY OF THE INVENTION

In accordance with the present invention, there is provided an exceedingly versatile precision woodworking accessory for use with diverse hand-held power equipment as circular saws, routers and the like, wherein setup is easily accomplished, truing and accuracy are easily achieved, and enhanced and speedy output is attained.

To this end, there is provided a pair of parallel guide rails, preferably cylindrical tubing for rigidity and which are externally smooth or polished, which rails are readily secured in a selected adjusted height position as by screws or bolts to a subjacent table member of wood or like laminate. The table member may be scrap plank material, or may be itself precision cut and shaped to facilitate board feeding and other woodworking operations. A central carriage is disposed between the rails and slidably attached thereto by means of arcuate or cylindrical shoes attached to the central carriage and carried by the rails.

The carriage is effectively suspended from the rails in spaced relation to the table therebeneath, thereby permitting passage thereunder of board or like stock to be subjected to woodworking operations, as crosscut, angle cut, or rip sawing, dado cuts, mitering, saber sawing, routing, and the like.

To this end, the slidable carriage is provided with a central opening or aperture of substantial diameter to receive and carry a mounting plate for a selected power tool. The mounting plate and carriage opening are cooperatively associated to not only permit the plate to be received on and carried by the carriage, but also to be capable of turning or rotational movement therein through at least 90° in either direction from a straight-ahead position.

Means are provided to releasably lock the tool mounting plate in any desired rotational position on the carriage, usually but not necessarily in a straight-ahead position for crosscut sawing, for example, or in a position 90° thereto for desired ripsaw operations.

In like manner, the carriage proper can be releasably secured at any point along the length of the rails to be fixed with respect thereto, as for rip sawing, as noted further hereinafter.

The mounting plate as indicated carries the woodworking tool, as a normally hand-held circular saw, which latter is releasably secured to the mounting plate while in use. To this end, the mounting plate carries clamp means to detachably easily secure the frame or base of the woodworking equipment to the plate.

Heel-and-toe adjustment means are cooperatively provided on the carriage and mounting plate for the purpose of assuring proper fore-to-aft alignment of the saw blade parallel to the guide rails when the saw is at its stop position. While the saw blade will invariably be at right angles to its drive shaft, in some instances the saw housing or face support flanges thereof will by off a few degrees, whereby when the mounting plate is turned to its straight-ahead stop on the carriage which would align with the saw housing, the blade proper may be canted right or left slightly. The stop indicator for the mounting plate is adjustable to accommodate final truing for accurate blade alignment.

The mounting plate is configured as required for the tool used. Thus, illustratively, for a saw, the plate will be provided with a slot of sufficient width and length to accommodate a projecting circular saw blade. Other configurations are provided for other tools, as hand-held power routers, sabre saw, shaping operations, and the like.

The board or other workpiece is received upon the base or frame and beneath the carriage and mounting plate. For safety, means are provided to assure hold-down for the board as the saw or other tool advances therethrough. The means comprises at least one and preferably two spaced flat leaf springs carried beneath the mounting plate such that the same bow downwardly from the plate, but flatten when encountering the board thickness. As the springs flatten, they extend in relative length in slots beneath the mounting plate to which the leading end of the springs are attached. Means are provided to adjust the yieldability of the springs as a function of the work.

The base also carries a miter fence pivoted thereto with degree angles thereon, whereby the fence can be set to any desired angle through 45° both right and left of center, and the workpiece held abutted thereagainst as the carriage with the saw is advanced. As with the heel-toe adjustment, means are provided to assure precise alignment of the miter fence with the carriage.

Other objects and advantages of the invention will become evident from the subsequent detailed description.

BRIEF DESCRIPTION OF THE DRAWINGS

The invention will be better understood with reference to the accompanying drawings, in which:

FIG. 3 is a side sectional elevation through the carriage and mounting plate showing diagrammatically a circular saw blade in relation thereto to to holddown springs;

FIG. 4 is a view similar to FIG. 3 wherein a workpiece between the carriage and base has deflected the holddown spring;

FIG. 7 is a fragmentary view showing a locking means for the carriage;

FIG. 8 is a plan view of an illustrative different mounting plate for a different tool, as a router; and, FIG. 9 is a side sectional view therethrough.

DESCRIPTION OF THE PREFERRED EMBODIMENT

Figure 1:
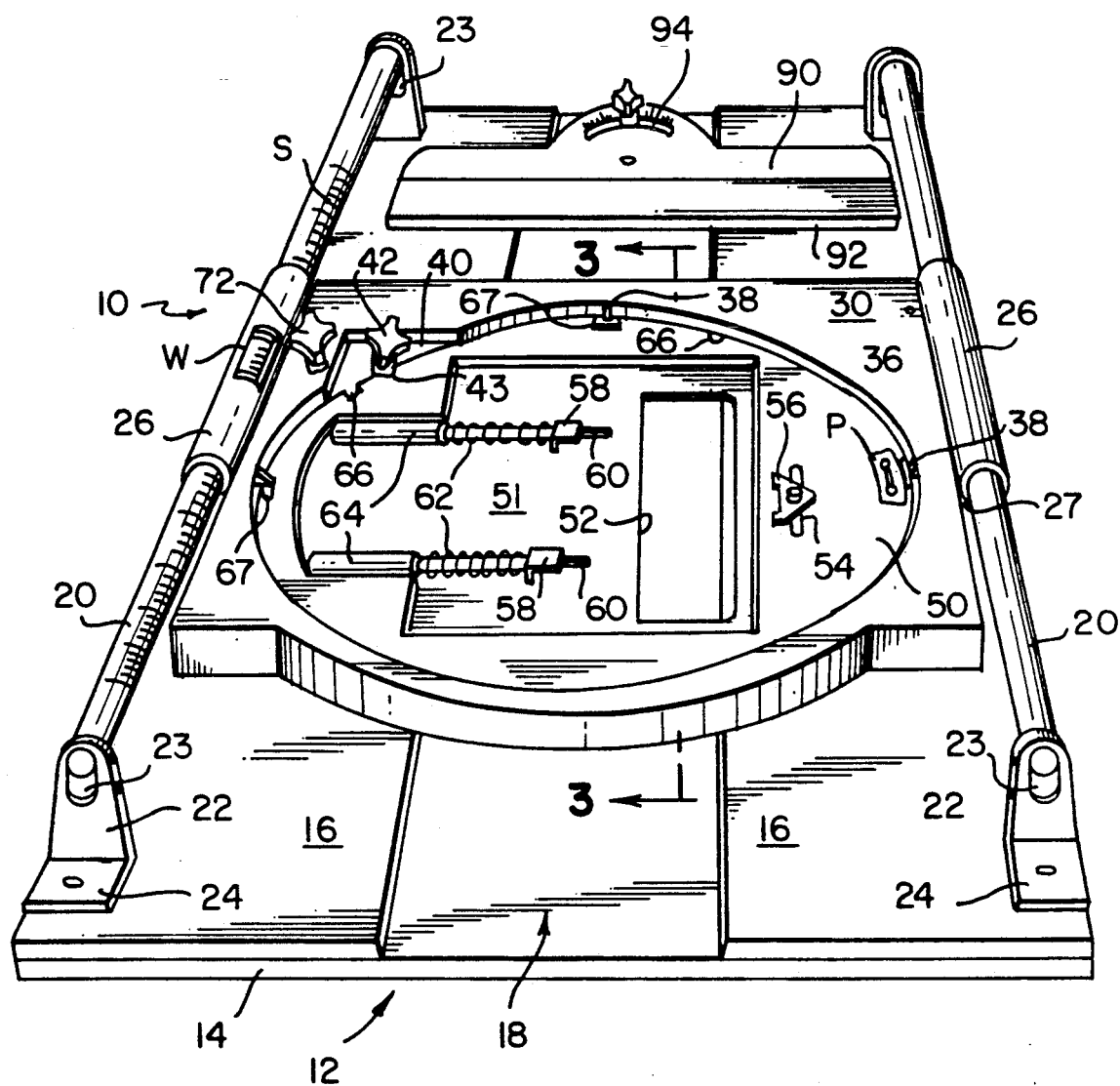
FIG. 1 is a perspective view of the apparatus of the invention, including a mounting plate on the carriage.

Referring to the drawings, there is seen at 10 the precision woodworking apparatus of the invention. The same is preferably associated with a table-like base 12 which may be prefabricated and supplied with the apparatus 10, or which may be fashioned at a worksite by the user, whether hobbyist or professional, and secured to the apparatus. One highly useful form of the table base includes a full-width base member 14 to the top of which are secured parallel work support members 16 as board planks in spaced relation to define therebetween a shallow channel 18. In practice to allow for safe draft of a saw blade, the channel may be on the order of $\frac{3}{4}''$ deep, that is, the planks 16 may have about a $\frac{3}{4}''$ thickness.

The base is preferably fabricated from wooden boards of a thickness such as to provide necessary rigidity as well as a desired depth of the channel 18 for the tools being used, as a circular saw, but if desired, the table base may be made from molded plastic or even metal members.

The apparatus of the invention is mounted to the table base 12, and to this end includes a pair of parallel rails 20 detachably secured to brackets 22 at either end thereof as by set screws or other means. The brackets in turn are secured to the table base 26 as by screws through bracket flanges 24. A feature of the rail-bracket assembly is that the brackets 22 are provided with elongated sockets or apertures 23 for the ends of rails 20 wherein the rails may be mounted in the brackets at the top, as shown, or may be detachably secured to the bracket 22 at the bottom of sockets 23. In this manner, ther vertical spacing of the rails, and thereby the carriage 30 and mounting plate 50, all described hereinafter, from the base 12 may be varied as desired, or as required by particular woodworking equipment. Illustratively, the provision of either $7\frac{1}{4}$ or $8\frac{1}{4}''$ diameter saw blades is conventional whereby a 1" difference between secured positions provided by sockets 23 permits ready use of either saw blade.

Figure 5:
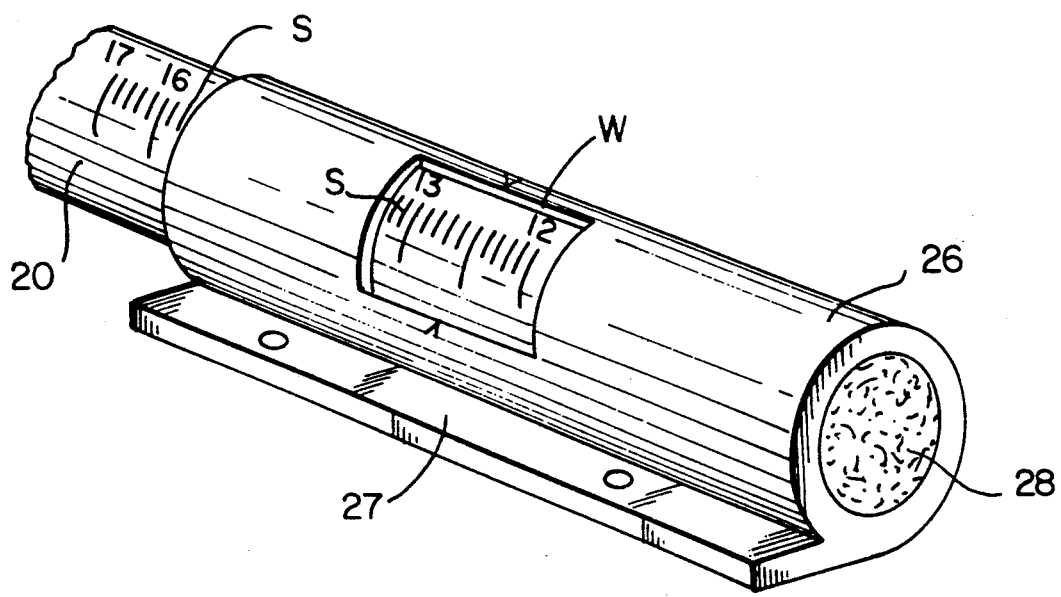
FIG. 5 is a perspective view of a slide sleeve for the carriage, including a fragmentary portion of rail.
Figure 6:
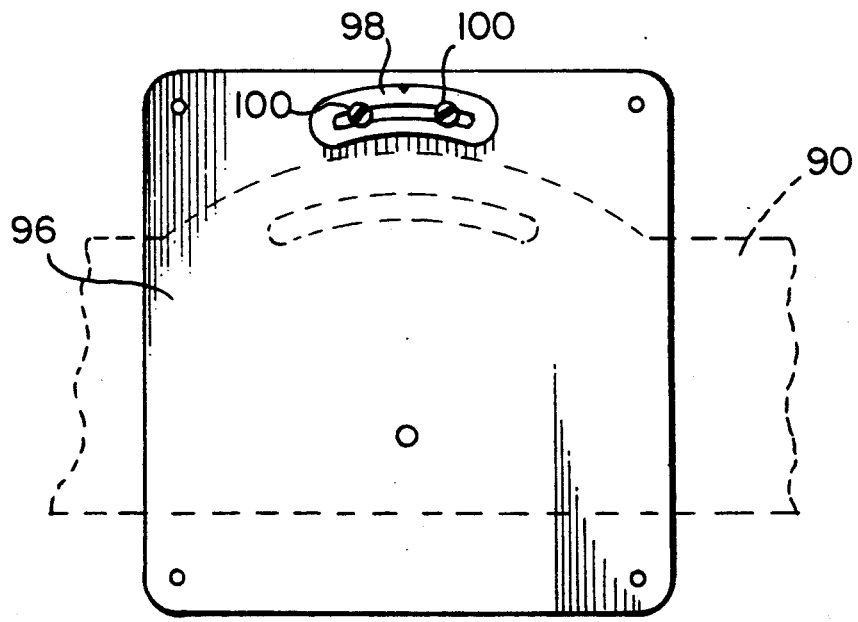
FIG. 6 is a top view of the miter fence base.

The rails 20 are preferably cylindrical tubes and have a smooth and polished exterior surface. The same respectively slidably carry tubular sleeves 26 thereon. The sleeves 26 may be formed of plastic, as nylon, and slid onto the respective rails prior to assembly of the rails to the end brackets 22. To facilitate easy sliding of the sleeves on the rails, the sleeves are provided with low friction internal surfaces as felt liners 28, as indicated in FIG. 5.

Figure 2:
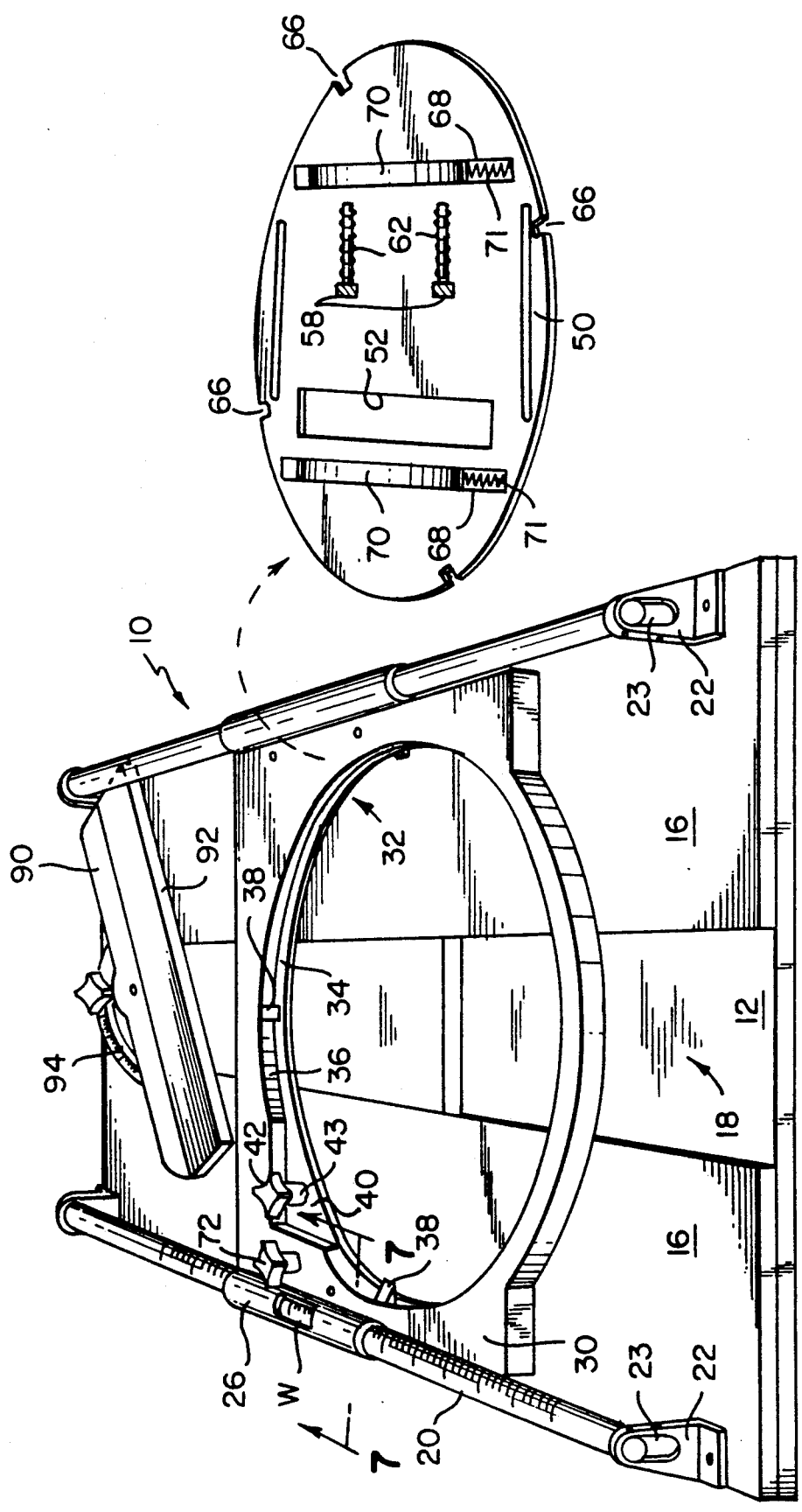
FIG. 2 is a perspective view similar to FIG. 1, but with the mounting plate removed therefrom and inverted in exploded manner, and with the miter fence shown also angled.

A salient feature of the invention contributing to the precision achieved thereby is the provision of scale means to assist in accurately positioning the sleeves 26 and thereby the equipment for cutting and shaping operations. At least one rail is provided with scale indicia S thereon, as by scribing, printing, etc., as seen in FIGS. 2 and 5. The sleeve 26, and preferably the sleeve adjacent the left side of the apparatus as seen in FIG. 1, is provided with a window W for ready viewing of the scale. Reference marks may be provided on the sleeve 26 to facilitate position determinations.

The sleeves 26 also include short horizontal flanges 27 extending inwardly toward each other to support and be secured as by bolts or like securing means to a transverse carriage 30 of substantial rigidity. Carriage 30 receives and supports in secured relation thereto a woodworking tool or piece of equipment as a hand-held circular saw, as will be described hereinafter, and is advanced along the rails in woodworking operations, whereby sufficient carriage rigidity and strength is required to withstand such usage. Thus, the carriage may be formed, as by injection molding, from polymeric material as for example, impact polystyrene, and provided with reinforcing ribbing and bracing in desired patterns as is known in the art to reinforce and strengthen the same, while minimizing excess usage or wastage of the plastic.

As seen in FIG. 2, carriage 30 includes a central circular opening 32 bounded by an inwardly extending flange 34 spaced below the top surface of carriage 30 by generally vertical wall 36. The wall 36 includes a series of lugs 38 at selected circumferential positions therearound spaced slightly above the flange 34 for cooperation with the tool mounting plate 50, as set forth hereinafter. In the illustrated embodiment, lugs 38 are four in number at the 90°, 180°, 270° and 360° positions. The flange 34 is widened radially outwardly in one area at 40 to receive a hand-operated clamping means 42 in cooperation with the tool mounting plate 50.

The tool mounting plate 50 is circular to sit upon flange 34 and be received within wall 36 of carriage 30, as seen in FIG. 1. Plate 50 is one of a series of such plates each respectively adapted to receive and carry a power tool. In the illustrated embodiment of FIG. 1, plate 50 is configured to receive a conventional hand-held circular saw. Such saws are well known in the art and are of essentially standardized construction, being principally characterized by a trigger-actuated motor-driven circular saw blade, a lower chordal portion of which extends beneath and perpendicular to a planar face or sole plate in usual face-to-face engagement with the surface of a board to be cut. The face plate includes opposite sides on either side of the blade and parallel thereto to assist in guiding the saw in a straight line, as is conventional.

For cooperation with such hand-held circular saws, plate 50 is provided with a generally rectangular or polygonal shallow recess 51 below the level of the plate top surface of sufficient size to accommodate the sole or face plate of the saw. The right-hand area of the recess 51 is provided with an elongated rectangular slot 52 through which the saw blade projects when the saw is mounted thereon, as generally indicated in FIG. 3. The right-hand edge of the recess 51 forms an abutment for the saw face plate and aligns the saw on the mounting plate 50.

Means are provided to releasably secure the saw to the mounting plate after seating the same in recess 51. As illustrated, just to the right of recess 51 and the saw blade slot 52, the plate 50 includes a short slot 54 in which a screw clamp 56 may slide a limited distance fore-and-aft to position itself as necessary to accommodate and overlie the right side edge of the sole plate of the saw. On the other side of recess 51, a pair of spring clamps 58 are guided by slots 60 to be urged by springs 62 to the right and against and over the left edge of a sole plate of a saw seated on plate 50. The springs 62 are socketed within housings 64 molded onto plate 50. Accordingly, in securing a saw to the mounting plate 50, the left edge of the saw sole plate is urged to the left against spring-urged clamps 58 sufficiently to bring the right edge of the saw sole plate to the left of right-hand clamp 56, after which the saw is placed fully flat on the plate, urged to the right by the springs 62 to place the saw plate flange beneath clamp 56, and clamp 56 is secured as by tightening a thumb nut and bolt assembly in known manner. The lateral shifting movement of clamps 58 permitted by slots 60 thereby enables the plate 50 to accommodate any of a number of circular saws having sole plates of slightly varying widths and configurations. If desired, means, such as a simple locking pin, may be provided to releasably retain the springs 62 and clamps 58 in a retracted position until the saw is seated on the mounting plate, and then released to engage the plate. This disclosed arrangement of recess 51 and clamps 56, 58 has been found operative with all readily available saws, thereby enhancing the versatile utility of the mounting plate 50. Further, this structure permits a saw to be attached or detached from plate 50 quickly and easily, literally requiring only seconds.

The circular plate is provided with a series of notches 66 at equidistant intervals corresponding to the lugs 38 above the carriage flange, but arcuately offset with respect thereto. Thus, the notches are offset 30° from the position of the lugs, with respect to an aligned fore-to-aft position of the plate and a saw blade carried thereby, being then at positions of 30°, 120°, 210°, and 300°. The notches 66 key with the lugs 38 upon rotational orientation therewith to permit the plate to drop downwardly along wall 36 to seat on the flange 34, after which rotation of the plate with respect to the carriage causes the arcuate periphery of the plate on either side of the notches to pass beneath the several lugs 38, whereby the plate is axially locked to the carriage while being rotatable with respect thereto.

In connection therewith, plate 50 also carries short upstanding lugs 67 at 90° intervals between notches 66, whereby by when the plate is seated on the flange and turned, the upstanding lugs 67 on the plate engage beneath the carriage lugs 66 to indicate that the plate 50 is substantially aligned on the carriage 30.

Principally during saw operations, the mounting plate 50 is locked or clamped to the carriage to be rotationally fixed with respect thereto. To this end, the aforesaid knob or handwheel 42 is threaded to a fixed nut carried by the carriage. Further, a collar or bushing 43 beneath knob 42 is so dimensioned with respect to the mounting plate so as to overlie a portion of the plate periphery. Accordingly, operation of the handwheel 42 to screw the same into the nut causes the bushing 43 to bear against the periphery of plate 50, thereby releasably locking the same to the carriage in a desired rotational position.

Plate 50 as the carriage 30, is preferably molded of plastic as by injection molding, with appropriate configuration, strengthening ribbing, cross-bracing, and the like, as desired.

The underside of plate 50 as seen in FIG. 2, is provided with at least one and preferably a pair of elongated recesses 68 for reception therein of bowed flat leaf springs 70. The springs 70 normally bow downwardly from plate 50 as seen in FIGS. 3 and 4, and are secured at their forward ends to the plate. The rear ends are relatively free within recesses 68 so as to move longitudinally therein when pressed upwardly to flatten the same, as when the carriage is advanced forwardly toward and over a board to be cut, as seen in FIGS. 3 and 4. Coil compression springs 71 are carried on the plate and provided at the leaf spring ends to bear thereagainst in yieldably resisting flattening movement, thereby to ensure that the leaf springs 70 restore to fully bowed position when the workpiece is no longer beneath the same. The leaf springs 70 thereby effect a firm and positive safety holddown for the lumber being cut, and prevent its kicking under engagement with the saw.

A small indicator P with an arcuate slot therein is disposed on the mounting plate 50 adjacent one of the alignment lugs 67. Indicator P carries a mark to be aligned with a like mark adjacent carriage lug 38. A screw or screws in a slot of indicator P may be loosened to shift the indicator slightly to ensure that the saw blade is parallel to the side rails for a true cut position. While the position of the saw face plate on the mounting plate will normally be substantially accurate, it may occur that the saw shaft and blade are slightly canted right or left with respect to the saw housing as clamped on the mounting plate. When this is determined, the indicator may be shifted slightly so that when the mounting plate is turned and locked onto the carriage under the lugs 38, the aligned marks will establish the straight-ahead position of the blade, even though the saw housing and face plate are slightly angled. Means are provided to lock the carriage with respect to the slide rails 20 when desired, as when attaching or demounting the mounting plate 50 with respect to the carriage, or, when in use, when the saw is placed in a fixed transverse position on the fixed carriage for ripping operations. The lock includes a knob or handwheel 72 carrying a threaded bolt 74 extending through a nut fixed to the carriage, the end of the bolt bearing against one end of a lever 76 pivoted to the carriage by a pin 78. The other end of the lever 76 is positioned as shown in FIG. 7 adjacent rail 20, whereby axial extension of bolt 74 upon turning of knob 72 causes the distal end of lever 76 to bear against the rail and lock the carriage thereat. Unthreading of the handwheel knob will release the brake to drop away from the rail. Suitable friction or brake means as rubber may be present on the rail-engaging portion of the lever to enhance the friction bite.

A miter fence 90 is provided adjacent the forward end of the apparatus, and is secured to the base or table for pivotal movement through 90° of arc in known manner, 45° to either side of center, thereby to effect desired angle cutting of sheet or board material abutted against the linear face 92 of a trued piece of wood 94 secured as by screws to the front edge of fence 90, as the saw is advanced by manual pressure to slide carriage 30 forwardly toward the fence.

To this end, the miter fence 90 includes an arcuate protractor slot 94 with appropriate degree markings, and is pivotally secured as by a bolt and nut to a base member 96 fixedly secured to the table 12 in channel 18. The base member serves to raise the support for the miter fence 90 to a level just above the work surface of table planks 16 over which the miter fence slidably pivots.

The base member 96 has adjustably surmounted thereon a zero point reference plate 98 for the miter fence 90. By loosening screws 100, the plate 98 may be shifted slightly to center the zero to adjust for any slight misalignments of the table and pivot.

With reference to scale indicia S on rail 20, the same is preferably keyed to the face of the miter fence, whereby the carriage 30 may be positioned to a selected measured point seen through window W of sleeve 26 for desired cutting, which point always may be reobtained by positioning of sleeve 26 with respect to the scale.

As indicated, while in the principal embodiment of the invention a mounting plate 50 has been shown for use with a circular saw, it is part of our invention that other and diverse mounting plates may be employed for other power tools used in woodworking. Another such plate is shown illustratively in FIGS. 8 and 9 at 110, and is adapted for use with a conventional hand-held power router. The mounting plate, apart from its adaptation to mount a router, with router tool apertures and usual like means, is otherwise the same as the plate 50 in terms of ready assembly and detachment with respect to the carriage 30. With router use, the plate would not always be locked in position as is the case for crosscut or rip-sawing, and the knob clamp 42 would be left free to permit arcuate repositioning of the router mounting plate 11 as desired.

Mounting plates for diverse power tools as mentioned above may be provided. The unique ability of the apparatus to receive, seat, position and clamp a mounting plate configured to receive and utilize differing tools as radial saws, or as a shaper, etc., while utilizing the carriage, rails, scale, miter fence, etc., as desired for the particular tool or work provides astonishing and reliable precision versatility to the apparatus.

Indeed, with shaping operations as well as with other tools, the cutting elements are fully enclosed in that they face downwardly beneath the plate and carriage. Accordingly, not only does the apparatus quickly convert from, say, crosscut saw usage to a shaper, but also the slide, scale, miter fence are all already set up for use. Further, with downwardly directed shaping blades of diverse contourcarried a shaper mounting plate, as compared to the usual upwardly facing shaping blades, safety is maximized and hazard to the operator is minimized in the present apparatus. Comparable benefits are present with other tools and mounting plates.

The invention in its versatility may take other specific configurations and forms, without departing from the spirit and scope thereof, as defined in the appended claims.

What we claim is:

1. A versatile woodworking apparatus comprising,
   a pair of spaced parallel guide rails,
   a carriage disposed between said rails,
   means supporting said carriage on said rails for slidable movement thereon,
   a woodworking accessory mounting plate,
   means mounting said accessory mounting plate to said carriage substantially centrally thereof,
   said accessory plate mounting means includes means for permitting arcuate movement through substantially 90° by said plate relative to said carriage about an axis generally normal thereto, thereby to position a said woodworking accessory at a desired angle with respect to said carriage, and
   means for releasably securing a woodworking accessory to said plate.

2. The versatile woodworking apparatus of claim 1 including means for releasably securing said carriage to said guide rails to fix said carriage at a selected location along said rails.

3. A versatile woodworking apparatus comprising,
   a pair of spaced parallel guide rails,
   a carriage disposed between said rails,
   means supporting said carriage on said rails for slidable movement thereon,
   said carriage having a generally circular opening,
   a woodworking accessory mounting plate,
   means mounting said accessory mounting plate to said carriage substantially centrally thereof in said opening, wherein operative tools of a woodworking accessory carried by said plate depend through said opening,
   said carriage circular opening bounded by radially inwardly extending flange means,
   said mounting plate including a peripheral flange receivable upon said carriage flange means to be supported thereby, and,
   means for releasably securing a woodworking accessory to said plate.

4. The versatile woodworking apparatus of claim 3 wherein said carriage inwardly extending flange means is vertically spaced below the top surface of said carriage by a generally vertical wall, whereby said mounting plate is received within a pocket defined by said wall and said flange.

5. The versatile woodworking apparatus of claim 3 wherein said mounting means and said mounting plate have cooperating means therebetween for permitting arcuate movement of said plate in said opening through substantially 90° relative to said carriage about an axis generally normal to said base, thereby to position a said woodworking accessory at a desired angular position with respect to said carriage.

6. The versatile woodworking apparatus of claim 5 further including means for releasably securing said plate in a desired angular position.

7. The versatile woodworking apparatus of claim 5 further including means for indicating the rotational position of said mounting plate for effecting alignment of the woodworking accessory.

8. The versatile woodworking apparatus of claim 7 wherein said indicating means is adjustable through a limited arc of rotation of said plate, thereby to effect precise alignment of a woodworking accessory carried by said plate.

9. The versatile woodworking apparatus of claim 1 wherein said supporting means for said carriage includes soft surfaces in engagement with said rails to facilitate sliding therealong.

10. The versatile woodworking apparatus of claim 9 wherein said rails are tubular members having smooth external surfaces against which said soft surfaces slide.

11. The versatile woodworking apparatus of claim 9 wherein said carriage supporting means includes arcuate lateral flanges conforming to the arcuate surfaces of said rails, said flanges having said soft surfaces in the inside faces of said flanges.

12. The versatile woodworking apparatus of claim 2 wherein said carriage securing means includes a clamp carried by said carriage and manual means for engaging said clamp with and disengaging said clamp from a said rail.

13. The versatile woodworking apparatus of claim 12 wherein said clamp comprises a lever pivotally secured to said carriage, and said manual means effects pivoting of said lever towards and away from said rail.

14. The versatile woodworking apparatus of claim 1 wherein said accessory mounting plate includes leaf spring workpiece holddown means on the underside thereof.

15. The versatile woodworking apparatus of claim 14 wherein said mounting plate underside carries a pair of laterally spaced grooves, and said leaf spring means is a pair of leaf springs mounted to said grooves to depend therefrom.

16. The versatile woodworking apparatus of claim 15 wherein said leaf springs are respectively fixed in said grooves at one end with the other end thereof slidably received in said grooves, whereby upon upward pressure exerted thereagainst as by a subjacent workpiece, said springs will yield by relative flattening as the slidable ends thereof slide in said groove to effectively elongate said leaf springs.

17. The versatile woodworking apparatus of claim 16 including means for restoring said leaf springs to fully bowed condition following removal of a work place from the apparatus.

18. The versatile woodworking apparatus of claim 1 further including a table-like base cooperatively associated with said rails and on which said rails are mounted in spaced vertical relation thereto, whereby workpieces may be placed upon said table-like base for work thereon.

19. The versatile woodworking apparatus of claim 18 wherein said table-like base has a miter fence pivotally mounted thereto, whereby a workpiece on said base urged against said fence may be positioned at a selected angle, and means for releasably securing said miter fence at a selected angle.

20. The versatile woodworking apparatus of claim 19 wherein said miter fence has means for effecting precise angular alignment thereof on initial adjustment of the apparatus.

21. The versatile woodworking apparatus of claim 1 wherein a said rail is provided with scale indicia, and said carriage supporting means is correlated to said indicia.

22. The versatile woodworking apparatus of claim 21 wherein said carriage supporting means is a sleeve slidable on said rail, and said sleeve has a window therein through which said rail indicia is visible.

23. The versatile woodworking apparatus of claim 1 wherein said carriage supporting means includes laterally extending flange members at either said of said carriage and overlying said rails for sliding movement thereon.

24. The versatile woodworking apparatus of claim 21 wherein said carriage supporting means includes laterally extending flange members at either said of said carriage and overlying said rails for sliding movement thereon,
said flange members having a window therein through which said rail indicia is visible.

25. The versatile woodworking apparatus of claim 3 wherein a said rail is provided with scale indicia.
said carriage supporting means includes laterally extending flange members at either said of said carriage and overlying said rails for sliding movement thereon, and,
said flange members having a window therein through which said rail indicia is visible.

26. The versatile woodworking apparatus of claim 1 wherein said woodworking accessory mounting plate is configured to receive a power saw as a woodworking accessory.

27. The versatile woodworking apparatus of claim 1 wherein said woodworking accessory mounting plate is configured to receive a power router as the woodworking accessory.

* * * * *